(12) United States Patent
Castro Borquez et al.

(10) Patent No.: US 12,399,673 B2
(45) Date of Patent: Aug. 26, 2025

(54) EMULATING BEHAVIOR OF AUDIO SYSTEMS

(71) Applicant: Neural DSP Technologies OY, Helsinki (FI)

(72) Inventors: Douglas Andres Castro Borquez, Helsinki (FI); Eero-Pekka Damskägg, Helsinki (FI); Athanasios Gotsopoulos, Helsinki (FI); Lauri Tuomas Juvela, Helsinki (FI); Aleksi Tapani Peussa, Helsinki (FI); Kimmo Erik Antero Rauhanen, Helsinki (FI); Thomas William Sherson, Helsinki (FI)

(73) Assignee: NEURAL DSP TECHNOLOGIES OY, Helsinki (FI)

( * ) Notice: Subject to any disclaimer, the term of this patent is extended or adjusted under 35 U.S.C. 154(b) by 766 days.

(21) Appl. No.: 17/669,775

(22) Filed: Feb. 11, 2022

(65) Prior Publication Data

US 2022/0262330 A1 Aug. 18, 2022

Related U.S. Application Data

(60) Provisional application No. 63/148,692, filed on Feb. 12, 2021, provisional application No. 63/149,170, filed on Feb. 12, 2021.

(51) Int. Cl.
*G06F 3/16* (2006.01)
*B25J 9/12* (2006.01)
(Continued)

(52) U.S. Cl.
CPC .............. *G06F 3/162* (2013.01); *B25J 9/123* (2013.01); *B25J 9/1682* (2013.01); *G06F 3/165* (2013.01);
(Continued)

(58) Field of Classification Search
CPC . G06F 3/162; G06F 3/165; B25J 9/123; B25J 9/1682; G10H 1/0033; G10H 1/46;
(Continued)

(56) References Cited

U.S. PATENT DOCUMENTS 7,030,311 B2 * 4/2006 Brinkman .......... G06Q 20/4014
84/625
8,525,012 B1 * 9/2013 Yang ........................ G10H 1/46
84/602

(Continued)

OTHER PUBLICATIONS

Extended European Search Report for European Patent Application No. 22156656.5; European Patent Office, Munich Germany 80298; date of mailing Jul. 13, 2022.
(Continued)

*Primary Examiner* — Christina M Schreiber
(74) *Attorney, Agent, or Firm* — Thomas E. Lees, LLC (57) ABSTRACT

A system for emulating a physical audio system comprises a user interface (UI) and a digital model of the physical audio system. The UI comprises virtual controls for changing virtual control settings (e.g., a virtual volume control for changing a virtual volume setting, etc.). A change in a virtual control setting produces a change to the output of the digital model. Because the digital model emulates the behavior of the physical audio system, changes to the model output in response to changes in the virtual control settings correspond to changes in the audio output in response to changes in the physical control settings. For example, if the physical audio system is an audio amplifier with control knobs, then the virtual controls will affect the output of the digital model like the control knobs affect the audio output of the audio amplifier.

19 Claims, 5 Drawing Sheets

(51) Int. Cl.
*B25J 9/16* (2006.01)
*G10H 1/00* (2006.01)
*G10H 1/46* (2006.01)
*H04S 7/00* (2006.01)

(52) U.S. Cl.
CPC ............ *G10H 1/0033* (2013.01); *G10H 1/46* (2013.01); *H04S 7/30* (2013.01); *G10H 2210/155* (2013.01); *H04S 2400/01* (2013.01)

(58) Field of Classification Search
CPC .. G10H 2210/155; H04S 7/30; H04S 2400/01
USPC .................................................. 84/602, 609
See application file for complete search history.

(56) References Cited

U.S. PATENT DOCUMENTS

| | | | | |
|---|---|---|---|---|
| 9,439,010 | B2 * | 9/2016 | Choi | H04R 29/00 |
| 9,642,221 | B2 * | 5/2017 | Schlangen | G06F 3/167 |
| 10,996,917 | B2 * | 5/2021 | Graham | H04S 7/40 |
| 2020/0279546 | A1 * | 9/2020 | Chase | G10H 1/125 |
| 2021/0166718 | A1 * | 6/2021 | Castro Borquez | G06F 3/165 |
| 2022/0051647 | A1 * | 2/2022 | Chang | G06F 3/162 |
| 2022/0103963 | A1 * | 3/2022 | Satongar | H04N 7/147 |
| 2022/0262330 | A1 * | 8/2022 | Castro Borquez | G06F 3/165 |
| 2022/0386025 | A1 * | 12/2022 | Moles | H04R 29/005 |
| 2023/0119557 | A1 * | 4/2023 | Castro Borquez | G10H 1/0091 |
| | | | | 704/232 |
| 2023/0368759 | A1 * | 11/2023 | Johnson | G10H 1/361 |
| 2024/0161720 | A1 * | 5/2024 | Castro Borquez | G06F 3/165 |
| 2024/0233695 | A1 * | 7/2024 | Parlon | G10H 1/348 |
| 2024/0259760 | A1 * | 8/2024 | Mehrabi | H04R 5/02 |

OTHER PUBLICATIONS

Damskagg, Eero-Pekka et al.; "Deep Learning for Tube Amplifier Emulation"; Acoustics Lab, Dept. of Signal Processing and Acoustics; Aalto University; Espoo, Finland; ICASSP 2019.

Chowdhury, Jatin; "A Comparison of Virtual Analog Modelling Techniques for Desktop and Embedded Implementations"; Center for Computer Research in Music and Acoustics; Stanford University, Palo Alto, CA; Sep. 6, 2020.

* cited by examiner

EMULATING BEHAVIOR OF AUDIO SYSTEMS

CROSS REFERENCE TO RELATED APPLICATIONS

This application claims the benefit of U.S. provisional patent application Ser. No. 63/149,170, filed 2021 Feb. 12, by Borquez, et al., and having the title "Emulating Behavior of Audio Systems," and also to U.S. provisional patent application Ser. No. 63/148,692, filed 2021 Feb. 12, by Borquez, et al., and having the title "Robotic System for Controlling Audio Systems," both of which are incorporated herein by reference in their entireties as if set forth expressly herein.

BACKGROUND

Field of the Disclosure

The present disclosure relates generally to audio systems and, more particularly, to emulating the behavior of audio systems.

Description of Related Art

Audio systems (such as, for example, audio amplifiers) exhibit different responses based on many different factors. For example, the behavior of audio systems can differ based on the settings (e.g., volume, treble, bass, etc.), manufacturer (e.g., Marshall Amplification, Fender Musical Instruments Corporation, VOX Amplification/Korg, etc.), types (e.g., vacuum tube, solid-state, hybrid, etc.), effects, controls, and a plethora of other factors.

SUMMARY

The present disclosure provides a system for emulating a behavior of a physical audio system (e.g., an audio amplifier, an effects pedal such as an overdrive pedal, an audio speaker cabinet, etc.). Broadly, the disclosed system comprises a user interface (UI) and a digital model of the physical audio system.

The digital model is controlled through the UI (e.g., a graphical user interface (GUI), etc.). Similar to how a physical audio system comprises physical controls for changing physical control settings (e.g., a volume control knob for changing a volume setting, a bass control knob for changing a bass setting, a treble control knob for changing a treble setting, etc.), the disclosed system comprises virtual controls for changing virtual control settings (e.g., a virtual volume control for changing a virtual volume setting, a virtual bass control for changing a virtual bass setting, a virtual treble control for changing a virtual treble setting, etc.). The virtual controls and their corresponding virtual control settings are displayed on the UI, thereby permitting a user to manipulate the virtual controls through the UI. Similar to how a change in a physical control setting produces a corresponding change in the audio output (e.g., increasing the volume setting produces a louder audio output, decreasing the bass setting reduces lower-frequency content in an audio output, etc.), a change in a virtual control setting produces a corresponding change in the output of the digital model.

Because the digital model emulates the behavior of the physical audio system, changes to the model output in response to changes in the virtual control settings correspond to changes in the audio output of the physical (or other emulated) audio system in response to changes in that system's control settings. By way of example, if a reference audio system is a physical audio amplifier with control knobs, then the virtual controls can affect the output of the digital model in substantially the same way that the control knobs affect the audio output of the audio amplifier.

In this regard, in some embodiments, the behavior of the physical audio system is accurately emulated by evaluating the audio system using a control sequence of control values to represent samples of the audio system at multiple settings. If more unique settings are captured, then a more accurate emulation is achievable. However, it is not necessary to sample every possible setting in order to achieve an accurate emulation. Rather, a sufficiently high number of samples can be utilized to determine a responsive behavior of the audio system, at least across the range of settings of the audio system that are characterized by the control sequence. The aggregate of all samples evaluated is used to build an emulation that comprises a more detailed model than what is captured in a single snapshot of the underlying reference (i.e., physical audio system).

In this manner, the virtual controls on the UI are "tuned" so that settings represent an emulated response of the physical audio system (e.g., amplifier, etc.) on the corresponding settings, without the need to load "snapshots" or otherwise switch or load a new presets. In some embodiments, knowledge of the evaluation of the audio device can be utilized to program the virtual controls in the UI to more closely emulate the (often complex) behavior of the physical audio system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Audio systems behave differently based on many different factors. For example, the behavior of an audio system can differ based on its settings (e.g., volume, treble, bass, etc.), manufacturer (e.g., Marshall Amplification, Fender Musical Instruments Corporation, VOX Amplification/Korg, etc.), type (e.g., vacuum tube, solid-state, hybrid, etc.), and a plethora of other factors. Because of this, it is important to understand how a particular audio system behaves in response to different types of inputs at different settings. Consequently, there are ongoing efforts in the industry to determine the responsive behaviors of different types of audio systems from different manufacturers.

In conventional systems, multiple individual snapshots are taken of a physical audio system at multiple physical control settings, with each snapshot virtually representing the physical behavior of the audio system at a particular individual setting. Thus, conventional systems have a finite number of virtual representations of the physical audio system. Moreover, once a snapshot is taken, traditional systems do not have any accurate record of the exact settings of the various controls used to capture the snapshot. In this regard, the conventional system collecting the snapshot may be agnostic to the reference audio system and/or any of its control values. Consequently, a user has a limited choice based on the number of snapshots that were taken of the physical audio system. As one can imagine, a complete virtual representation of the physical audio system would require an impractically large number of snapshots (sometimes up to several billion snapshots), taken over an impractically long period of time (sometimes up to several weeks), and occupying an impractically large amount of digital storage space (sometimes on the order of several hundred gigabytes (GB)).

Unlike conventional systems, the disclosed embodiments teach systems and methods that capture a sufficiently dense random sampling to create a digital model of the physical audio system. Thus, instead of taking a snapshot at every possible setting, the digital model is created from a finite, random sampling, which (with sufficient density) permits the digital model to emulate the behavior of the physical system across various control settings, even at every physical control setting. In other words, the digital model does not require an impractically large number of samples, does not require an impractically long period of time to capture, and does not require an impractically large amount of digital storage space. However, the model is a more complex than a simple snapshot. Upon capture, the digital model permits a user to emulate the physical audio system through a user interface that provides virtual controls that can correspond directly to the physical controls on the physical audio system such that adjustment of such controls mimics the behavior of the corresponding physical control of the physical audio system.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents. For purposes of clarity: (a) first, the components within the architecture are identified; (b) second, the structural relationships between the components and the functions of the components are discussed.

Figure 1:
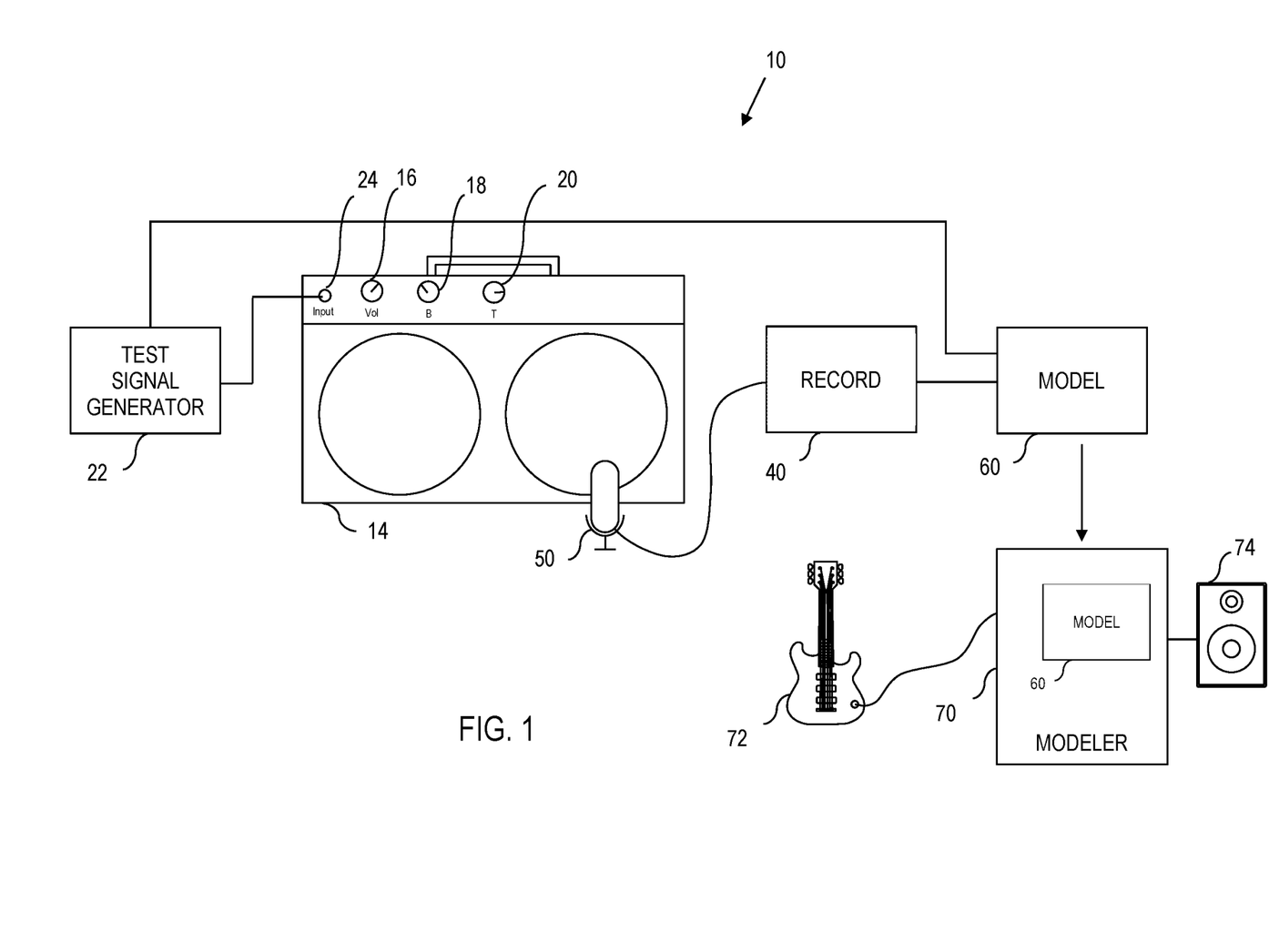
FIG. 1 is a diagram showing a one-file-to-one-setting system.

Referring now to FIG. 1, a block diagram of a system 10 illustrates a useful approach to model the behavior of a particular reference audio amplifier at a single amplifier setting. Solely by way of example, the illustrated system 10 models a reference audio device 14, e.g., a physical audio amplifier with physical controls, such as a volume control 16, a bass control 18, and a treble control 20. For these systems, each control, e.g., volume control 16, bass control 18, and treble control 20 on the amplifier, is set to a desired position so as to create a "snapshot" of the reference audio device 14 at a single setting. A test audio signal generator 22 provides a test audio signal to the reference audio device 14, e.g., via an input 24 of the audio amplifier, and an output of the reference audio device 14 is recorded by a recording system 40. For instance, in an example embodiment, the output of the reference audio device 14 is a musical instrument "combo cab", which contains an amplifier and speakers. Thus, the output can be captured, e.g., through a microphone 50. A microphone 50 represents a convenient way to capture the output of the reference audio device 14 when produced by a speaker. In another example, the output of the reference audio device 14 can be captured by recording an output electrical signal, e.g., a line level out, a direct out, a preamp out, a speaker level electrical out. When capturing an electrical signal, some signal processing may be required (e.g., for performing level conversion, impedance matching, etc.).

The recorded output is then used to create a model 60 of the reference audio device 14, e.g., a snapshot of the amplifier at that particular setting. With a high-quality model 60, the output of the model 60 can be substantially similar (if not identical) to the output of the reference audio device 14, but only for the particular setting on which the output of the reference audio device 14 was modeled.

In practice, the model 60 is loaded by a "modeler" 70 i.e., a signal processing device distinct from the amplifier 14. Thus, a musician that would normally plug a musical instrument 72 into the input 24 of the amplifier 14, instead plugs the musical instrument into an input of the modeler 70. Using an interface of the modeler 70, the musician loads the model 60 in the modeler 70. The output of the modeler 70 is fed to an output 74, e.g., a recording interface, a monitor speaker, an amplifier, a full range frequency response (FRFR) speaker, etc. The modeler 70 processes the signal from the musical instrument 72 through the model 60 loaded into the modeler 70 to produce an emulated output of the reference audio device 14 at the modeled snapshot, without requiring the amplifier 14 itself.

In the digital modeler 70, if a user decides that the captured tone is not suitable, software controls can be provided via a user interface of the modeler 70, e.g., to adjust gain, tone, volume, and other characteristics of the sound. However, such additional signal processing is not emulating changes to the actual underlying reference audio device 14. Rather, such virtual controls are controlling generic external filters that are unrelated to the corresponding reference audio device 14, even if the label of the virtual control in the modeler 70 is the same as or similar to a corresponding control on the reference audio device 14.

Consequently, if a user wants to emulate any other settings on the reference audio device 14, e.g., any change to the volume control 16, the bass control 18, the treble control 20 of the illustrated amplifier, etc., then a new model must be created. In other words, if a user wants to emulate a new (or different) control setting of the reference audio device 14 in the modeler 70, then a new model must be created, e.g., as described more fully above. Then new model can be saved as a separate and distinct, recallable preset, snapshot, file or other loadable component of the modeler 70.

As one can imagine, to obtain emulations for the complete behavior of a particular amplifier, the responses of amplifier must be measured exhaustively at every possible amplifier setting. In other words, the setting for each physical control (e.g., volume control, bass control, mid control, treble control, gain control, contour control, etc.) can be changed incrementally and a response measured for each of the different settings. By way of example, for an audio amplifier with five (5) controls such as potentiometers (which is somewhat common in the industry), if each control is simplified as having ten (10) possible settings, then the total number of settings necessary to determine a complete emulation at every setting would be 100,000 individual measurements (one at each setting). This type of exhaustive measurement results in a plethora of problems.

First, incrementally changing every control in an audio amplifier to cover all possible settings is time-consuming and inefficient. The time duration for turning the knobs/controls is proportional to the required rotation. However, for same of simplified illustration, using the 5-control example, presuming that it takes only one (1) second to change a control/knob value, it would take 100,000 seconds (or nearly 28 hours) to cycle through all of the possible settings. If a sixth similar control is added, then that time increases to almost twelve (12) days, which is impractical. Moreover, turning controls/knobs is not enough. The system needs to acquire data as well. In this case, the one second estimation is overly optimistic, and significantly more time is realistically required.

Also, and equally problematic as (or even more problematic than) the time required for all of these measurements, is the repetitive and mechanical wear on the components. Because the response is typically measured at each unique setting, the amplifier settings must be changed in direct proportion to the number of controls (e.g., knobs, sliders, toggle switches, multi-way switches, concentric knobs, push-pull potentiometers, rotary encoders, foot switches, etc.) and the number of settings for each control. Thus, again using a 5-control-10-settings-each—amplifier example, at least 100,000 unique control settings would be required. As one can appreciate, the repetitive and mechanical wear can easily exceed the life cycle of the control. In other words, with enough settings, components of the amplifier could be worn, damaged, destroyed, etc., before the amplifier could be properly emulated at every setting.

Additionally, and what is not readily apparent, is that a systematically iterative approach results in uneven wear of components. For example, for each turn of the first control/knob, the second control/knob would require ten (10) turns; for each turn of the second control/knob, the third control/knob would require ten (10) turns; and so on. Thus, mathematically, the fifth control/knob experiences a 10,000-fold number of turns as compared to the first control/knob. If the controls are implemented with potentiometers, then each control on the audio system has a limited usable life because potentiometers (which have mechanical components) have a finite number of duty cycles before malfunctioning. As such, the durability of the audio system becomes dependent on the most vulnerable potentiometer, most likely, the potentiometer that has been turned 10,000-fold. Again, it is entirely possible to damage component(s) of the amplifier before gathering all of the necessary information from that amplifier.

Still further, a problem relates to the data itself. By way of example, for 100,000 samples of input-and-output audio pairs, if each sample is forty-eight (48) kilohertz (kHz) at sixteen (16) bits of resolution, the input-and-output data alone could occupy approximately 89 gigabytes (~89 GB) of data. Adding a sixth control/knob would increase the data requirement, e.g., ten-fold to ~890 GB in the above example.

Yet further, since each snapshot is a separate file that must be loaded, the number of files to manage and independently load makes accurate digital emulation of the amplifier as a whole, impractical. For instance, should one wish to emulate the amplifier at one setting, then one would load the emulation for that particular setting; and, if one wished to emulate the amplifier at a different setting, then that different setting would be loaded; and, so on and so on. In other words, the modeler utilizes a one-to-one correlation between each stored file/model and each setting of the reference audio system 14, from which that file/model was created.

Thus, although the embodiment of FIG. 1 provides a useful approach to emulating an amplifier, additional embodiments, as shown and described in the present disclosure, teach systems for emulating a reference audio system at many different settings. Unlike some systems in which there is a one-file-to-one-setting correlation (meaning, one setting corresponding to one digital file), the further following embodiments provide for a one-model-for-many-settings correlation (meaning, a single digital model emulates the behavior of the reference audio system for many different settings thereof).

Figure 2:
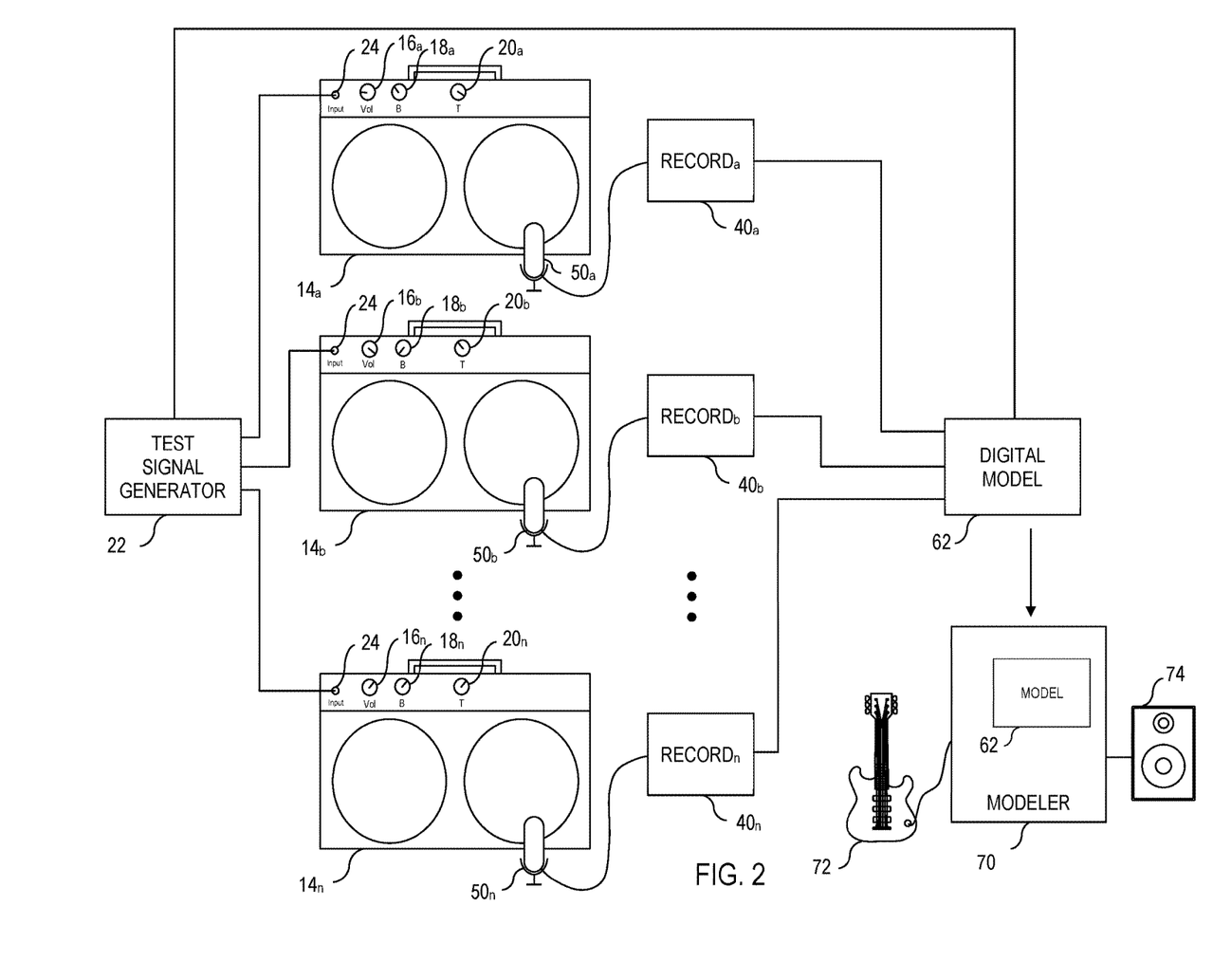
FIG. 2 is a diagram showing one embodiment of a one-model-for-many-settings system.

With this in mind, referring to FIG. 2, a one-model-for-many-settings embodiment is shown. Unlike the system of FIG. 1, the disclosed embodiment of FIG. 2 captures the audio output of the reference audio system 14 (e.g., a physical amplifier) at many different settings, e.g., a first capture of the amplifier at volume control setting 16a, bass control setting 18a, and treble control setting 20a; volume control setting 16b, bass control setting 18b, and treble control setting 20b; and so on, and so on to volume control setting 16n, bass control setting 18n, and treble control setting 20n, etc. (where n is any integer). Thus, unlike the one-to-one system (one-to-one correspondence of the reference audio setting to the model) the disclosed embodiment of FIG. 2 permits a single digital model 62 to emulate many different settings of the reference audio system 14.

For clarity, it should be appreciated that FIG. 2 shows a single reference audio system 14 being captured multiple times (and, hence, the multiple duplicates being shown as 14a, 14b . . . 14n). That is, the test signal generator 22 applies an input to the input 24 of the reference audio system 14, and the output of the reference audio system is captured at 40a. Then, the process repeats to record the output at 40b, etc., until output 40n is recorded. Each output is coupled to the processing necessary to generate the model 62. Thus, the recording blocks 40a . . . 40n (collectively, 40) represent a capture that occurs multiple times (and not necessarily multiple separate recording units, etc.). Furthermore, it should be appreciated that the recording 40 can be done within the digital modeler 70 itself or as a separate processing unit that creates the model to be loaded into the modeler 70. That is, a first process can collect and aggregate the data representing the different settings into the emulation, or the different settings can be input into a digital guitar processor that interacts with a musician. Thus, the various components are shown separate in block diagram form solely to distinguish function, and do not necessarily represent multiple instances of a given component. Likewise, the microphone 50a . . . 50n is provided for illustration purposes only. The output can be captured by a microphone, as an electrical signal, etc., as described more fully herein. Moreover, microphone positioning can be fixed for each capture, or the microphone position can move, e.g., to capture different room/environment conditions.

Continuing, once a model 62 is constructed to represent the reference audio system 14 across a range of settings, the model 62 can be loaded into a modeler 70. The disclosed modeler 70 provides a user interface (UI) with virtual controls that control virtual settings on the digital model 62 (e.g., a virtual volume control that controls a virtual volume setting, a virtual bass control that controls a virtual bass setting, a virtual treble control that controls a virtual treble setting, etc.). These virtual controls emulate the behavior of physical controls on the physical audio system represented by the model 62. In other words, similar to how a change in a physical control setting (on a physical audio system) produces a corresponding change in the audio output (e.g., increasing the volume setting produces a louder audio output, etc.), a change in a virtual control setting in the interface of the modeler 70 produces a corresponding change in the output of the modeler 70 (e.g., increasing the virtual volume setting produces a louder output for the digital model, etc.).

Because the digital model emulates the behavior of the physical audio system, there can be a direct correspondence between the virtual controls of the model 62 and the physical controls of the amplifier (reference audio system 14). Thus, changes to the output of the digital model in response to changes in the virtual control settings mimic changes in the audio output of the emulated audio system in response to analogous changes in the physical control settings. By way of example, if the physical audio system is an audio amplifier with control potentiometers, then the virtual controls will affect the output of the digital model in substantially the same way that the control potentiometers affect the audio output of the audio amplifier.

Providing a single model that emulates multiple different settings on a physical audio system (e.g., audio amplifier, overdrive pedal, speaker cabinet, etc.) reduces the data storage requirements, thereby providing a more-elegant one-to-many approach than the one-file-to-one-setting approach. Furthermore, the disclosed one-model-for-many-settings emulation operates under a remarkably different principle than the one-to-one approach because, unlike one-to-one systems, the disclosed embodiments permit dynamic adjustment of the digital model (which is not possible with the one-to-one approach).

As will be described in greater detail herein, the model can be created by treating the different amp setting captures as training data to train a neural network. The virtual controls (e.g., virtual volume, virtual bass, and virtual treble in the modeler interface) can then be mapped, trained, or otherwise configured so that changes to the virtual controls mimic the underlying emulated physical controls of the reference audio system 14, such as by interacting with the neural network to affect weights or other parameters. Other approaches can also be used to combine the various settings of the amplifier into a model, depending upon the underlying technology to generate the model.

Figure 3:
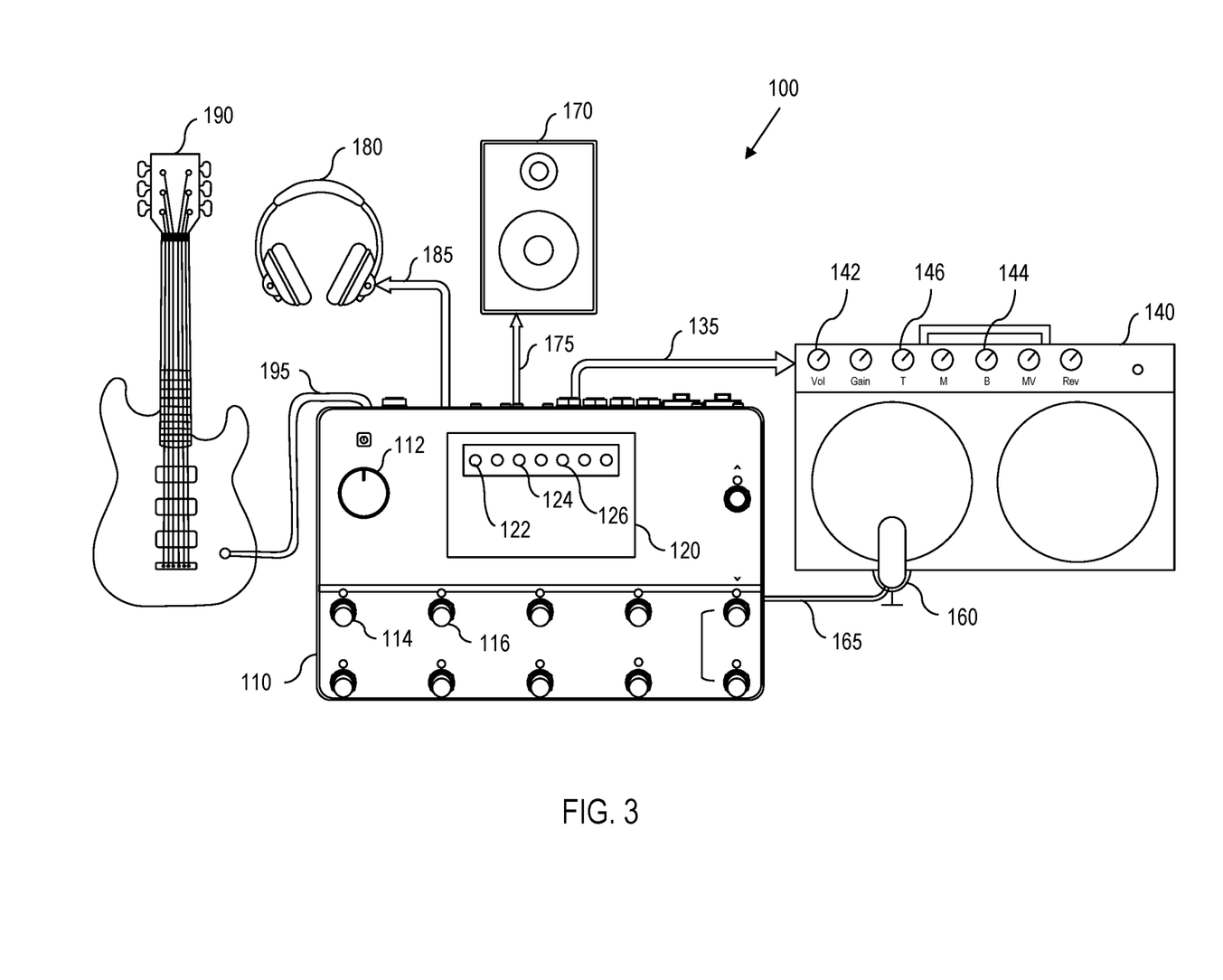
FIG. 3 is a diagram showing an acoustic environment with an example embodiment of a system for emulating the behavior of a physical audio system.
Figure 4:
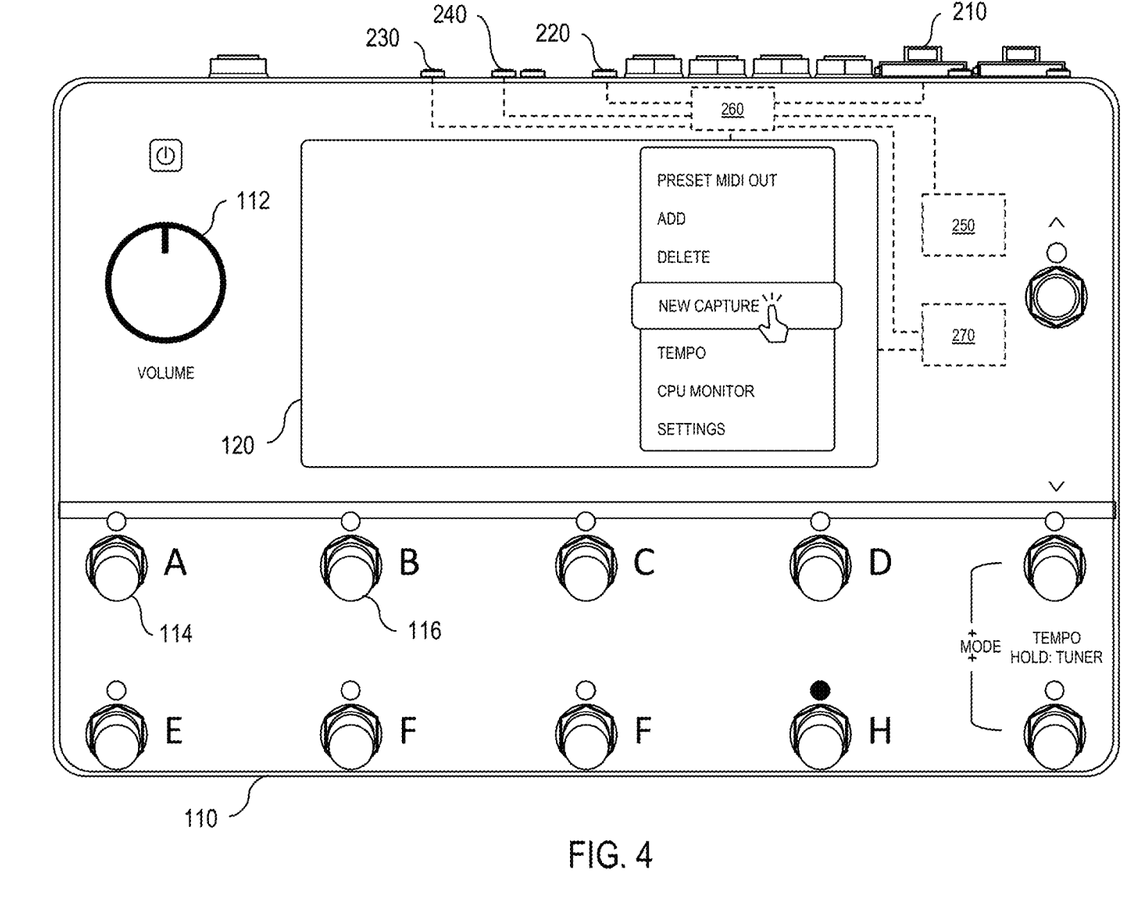
FIG. 4 is a diagram showing one embodiment of the system in capture mode.
Figure 5:
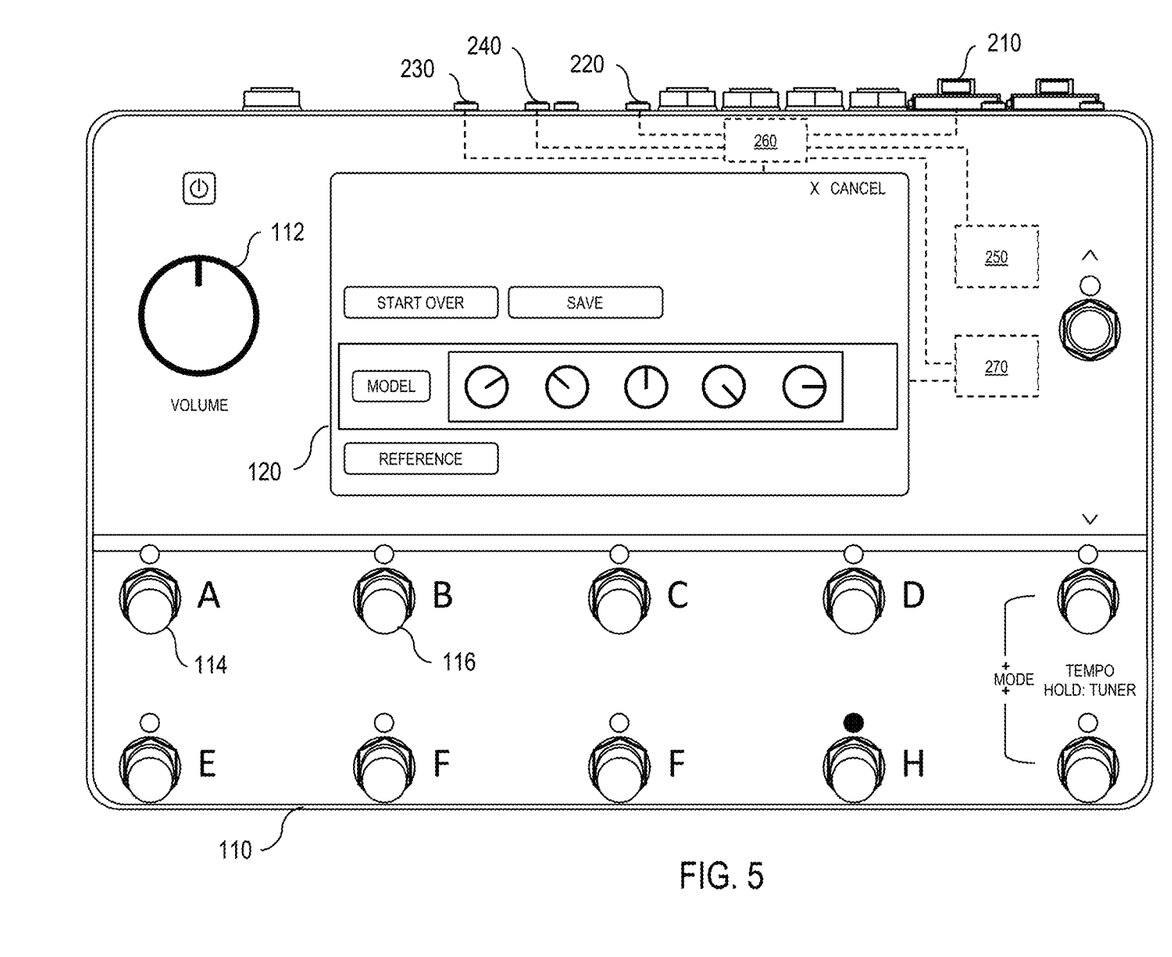
FIG. 5 is a diagram showing one embodiment of the system in user mode.

FIG. 3 shows an environment 100 with an example embodiment of a system 110 (e.g., a modeler) for emulating the behavior of a physical audio system 140, while FIGS. 4 and 5 show the system (also denoted as an emulation system 110) in greater detail, specifically showing an embodiment of the system 110 in a capture mode (FIG. 4) and an embodiment of the system 110 in a user/performance mode (FIG. 5). The system 110 can implement the functionality of the modeler 70 described in FIG. 1 and FIG. 2, and thus the disclosure of those figures is incorporated into the discussion of FIG. 3 through FIG. 5.

For purposes of clarity, a particular embodiment of the physical audio system 140 is shown in FIG. 3 as a physical audio amplifier 140 with physical audio controls, such as, for example, a physical volume control 142 with volume control settings, a physical bass control 144 with bass control settings, a physical treble control 146 with treble control settings, etc.

With reference to FIG. 3, FIG. 4, and FIG. 5 generally, the emulation system 110 comprises a user interface (UI) 120, an instrument input port 210, an audio output (e.g., a capture output port 220), a return port 230, and a model output port 240. The emulation system 110 also comprises internal components, such as a test signal generator 250 for generating a test audio signal, a switch 260 for switching between the capture mode and the user/performance mode, and digital model(s) 270 (shown as a neural network(s) (NN) 270 in FIGS. 4 and 5) that can be selectively loaded, etc.

The UI 120, can be utilized to load a preset, which can include among other features, the model captured of a reference audio system. For instance, the UI 120 can show the loaded model and parameters for adjusting the model. By way of illustration, an embodiment can comprise virtual controls, such as, for example, a virtual volume control 122 with virtual volume control settings, a virtual bass control 124 with virtual bass control settings, a virtual treble control 126 with virtual treble control settings, etc. It should be appreciated that the virtual controls can correspond to the physical controls of an emulation represented in a loaded model. Thus, in this example, the virtual volume control 122 corresponds to the physical volume control 142; the virtual bass control 124 corresponds to the physical bass control 144; the virtual treble control 126 corresponds to the physical treble control 146, etc. Also, the virtual settings correspond to the physical settings (e.g., the virtual volume setting corresponds to the physical volume setting, the virtual bass setting corresponds to the physical bass setting, etc.). For some embodiments, the virtual settings are loaded into the emulation system 110 along with the digital model 270. Other components in the environment 100 can include a microphone 160, a monitor 170, a set of headphones 180, and a musical instrument 190 (shown as an electric guitar 190 in FIG. 3).

In architecture, the electric guitar 190 is electronically coupled to the instrument input port 210 of the emulation system 110 though a standard guitar cable 195; the audio amplifier 140 is operatively coupled to the capture output port 220 of the emulation system 110 through a standard amplifier cable 135; the microphone 160 is electrically coupled to the return port 230 of the emulation system through a standard microphone cable 165; and the monitor 170 and headphones 180 are electrically coupled through their respective cables 175, 185 to output ports on the emulation system 110.

In operation, the emulation system 110 can include at least two (2) operating modes: e.g., a capture mode and a user mode. The emulation system 110 is set to either the capture mode or the user mode by the switch 260 (meaning, the switch 260 has a capture mode setting and a user mode setting), with the switch 260 being operatively coupled to the test audio signal generator 250 (when the switch 260 is set to a capture input setting) and the instrument input port 210 (when the switch 260 is set to a user input setting).

In capture mode, shown in FIG. 4, the test audio signal generator 250 generates a test audio signal. The test audio signal is provided to the physical audio system 140 through the capture output port 220 of the emulation system 110. The physical audio system 140 generates an audio system signal (e.g., audio output of an audio amplifier) in response to the test audio signal. The audio system signal is a function of both the test audio signal and the physical audio control settings (e.g., the settings of the physical volume control 142, the physical bass control 144, the physical treble control 146, etc.). The audio system signal is captured by the emulation system. For instance, where an output of the audio system 140 is generated by a speaker cabinet, the output can be captured by the microphone 160 and provided to the emulation system 110 through its return port 230. In this example, the microphone, microphone type, position, and environment of the amplifier will also contribute to the capture. Where the output is electrical, such as when capturing a preamplifier, effects pedal, amplifier without a speaker, etc., then a suitable electrical signal, e.g., a line level signal can be routed to the return port 230 without needing a microphone.

In some embodiments, to emulate the behavior of the physical audio system 140, virtual audio controls (e.g., virtual volume control 112, virtual bass control 114, virtual treble control 116, etc.) can be set in the UI of the emulation system to substantially the same function and/or setting as its corresponding physical audio control setting. In other words, a virtual volume control 112 is set to substantially the same setting as the physical volume control 142; a virtual bass control 114 is set to substantially the same setting as the physical bass control 144; etc. Consequently, each virtual audio control setting corresponds to its respective physical audio control setting. For some embodiments, the virtual audio controls 122, 124, 126 are displayed on the UI 120. In other embodiments, data such as metadata about the various settings can inform the UI 120 how to interpret virtual control/knob data relative to the various captures that are collected in order to emulate the amplifier (or other audio system).

Once the emulation system 110 receives the audio system signal through the return port 230, that audio signal is digitized and provided to the digital model 270 (e.g., neural network (NN), a filter-based architecture, etc.), which receives the digitized audio signal. The digital model 270 then determines various parameters of the digital model from the test audio signal, the virtual audio control setting (which correspond to the physical audio control setting) and the audio system signal.

In an example embodiment, such as where the model is implemented as a neural network, the test audio signal, the virtual audio control setting, and the audio system signal are denoted as a data triplet. Because more than one audio control setting is likely needed to characterize the behavior of the physical audio system 140, the settings on the physical audio controls 142, 144, 146 are set/changed, a test signal is generated by the test signal generator 250, and an audio system signal is received through the return port 230. This process is repeated as many times as necessary and/or desired by the user.

Thus, in the example embodiment, the digital model 270 executes an iterative process to gather multiple data triplets at different audio control settings. The iterative process continues until a predefined threshold condition is met.

In an example embodiment, the digital model 270 is a neural network (NN). In another example embodiment, the digital model 270 is a neural network that applies a perceptual loss function based upon a psychoacoustic property and, thereafter, sets node values or neural network parameters in response to the applied perceptual loss function. In other words, the neural network 270 is trained using the perceptual loss function, which is described in greater detail in U.S. patent application Ser. No. 16/738,512, filed on 2020 Jan. 9 and having the title "Neural Modeler of Audio Systems," which is incorporated herein by reference as if expressly set forth in its entirety. For this preferred embodiment, the neural network 270 executes the iterative process on consecutive data triplets until a predefined error limit is reached.

It should be noted that an advantage of using a neural network 270 is that parameters for physical audio systems with nonlinear responses can be readily determined by the neural network 270. Further advantages can be realized by using a sufficiently dense, sorted random sampling to select the virtual audio control settings. For example, the sufficiently dense, sorted random sampling reduces the time, reduces the wear and tear of physical components, and reduces the data storage requirements remarkably.

Insofar as sufficiently dense, sorted random sampling and its advantages are discussed in detail in U.S. Patent Application No. 63/148,692, having the title "Robotic System for Controlling Audio Systems," was filed on 2021 Feb. 12, which is incorporated by reference herein as if expressly set forth in its entirety, further discussion of sufficiently dense, sorted random sampling is omitted here.

When the iterative process has reached its threshold stop condition, the digital model 270 emulates the physical audio system 140. In practical applications, it is often desirable for virtual controls to mimic the corresponding controls on the emulated amplifier. In this regard, data processing, e.g., using a control layer, algorithm or other approach maps the virtual controls so that adjustments to the virtual controls cause the model to output a signal that approximates the emulated system (e.g., amplifier, effect, speaker cabinet, system, etc.) at the same settings. Thus, changes to the virtual audio controls 122, 124, 126 will change the output of the digital model 270 in substantially the same way that changes to the physical audio controls 142, 144, 146 change the audio output of the physical audio system 140.

In other applications, artistic control may be provided to the user to modify the virtual controls to exhibit behavior based upon, but not directly mimicking the emulated amplifier. For instance, a virtual knob can be programmed such that one virtual knob position can represent changes to multiple controls of the emulated amplifier (e.g., to save space on the screen, to minimize the number of controls the musician has to interact with, etc.). Regardless, the model utilized herein is a complex and responsive model that emulates the behavior of the reference audio system across settings, and not simply at a single snapshot.

Once the emulation system 110 has captured sufficiently the behavior of the physical audio system, the emulation system 110 can be switched to user mode, as shown in FIG. 5. The emulation system 110 is switched to user mode through the switch 260. In user mode, the switch 260 selects as its input the instrument input port 210 (rather than the test signal generator 250), thereby allowing an instrument (such as the electric guitar 190) to be played through the emulation system 110.

In user mode, when a user can change one or more settings of the virtual control 122, 124, 126 through the UI 120. Because the digital model 270 emulates the physical audio system 140, the changed settings of the virtual controls 122, 124, 126 will result in the digital model 270 changing its output in substantially the same way that the physical audio system 140 would change its audio output based on changes to the physical controls 142, 144, 146. Consequently, the digital model 270 now provides a substantially accurate emulation of the physical audio system 140.

To check the fidelity of the emulation system 110, the UI 120 also provides the user with an option to play the electric guitar 190 (or other instrument) through the digital model 270 or, alternatively, through the physical audio system 140

(labeled as Reference in FIG. 5). If the user selects the digital model 270, then the electric guitar signal is directed through the digital model 270 and then to the monitor 170 or headphones 180, thereby allowing the user to listen to the performance through the digital model 270. Conversely, if the user selects the physical audio system 140 (or Reference), then the electric guitar signal is passed through the emulation system 110 to the physical audio system 140, thereby allowing the user to listen to the performance of the physical audio system 140. By switching back-and-forth between the digital model 270 and the physical audio system 140, the user can compare how closely the digital model 270 emulates the physical audio system 140.

As shown through the embodiments of FIGS. 2 through 5, those having skill in the art will appreciate that the disclosed emulation system 110 provides an accurate digital model 270 that substantially mimics the actual behavior of a physical audio system 140 from which the digital model 170 was derived. Thus, unlike some systems (which allows for duplication of only a single-setting), the disclosed emulation system 110 allows for a single digital model 270 to emulate a particular audio system 140 at many different settings (rather than at a single setting), thereby allowing for a one-model-for-many-settings system.

The test signal generator 250, the switch 260, and the digital model 270 may be implemented in hardware, software, firmware, or a combination thereof. In the preferred embodiment(s), the control device is implemented in software or firmware that is stored in a memory and that is executed by a suitable instruction execution system. If implemented in hardware, as in an alternative embodiment, the control device can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

With reference to FIG. 1 through FIG. 5, generally, and drawing from the pending patent applications and other documents incorporated by reference herein (discussed above), a process for building emulations of audio systems is provided. The process can comprise performing training file generation of an audio system until a stopping condition is met (e.g., collecting a series of captures as illustrated in FIG. 1, FIG. 2, etc.), where a select control of the audio system is set to an initial control value selected within a control space. For simplicity, a "control" is described herein, but in practice, a number of controls can be considered.

The training file generation is carried out by feeding an input signal to an input of the audio system (see for example, test signal generator 22, FIG. 1 and FIG. 2), storing a training file in memory (see for example, record box 40, FIG. 1 and FIG. 2) the training file representative of an output of the audio system responsive to the applied input signal, and changing the control value of the audio system to a new value if the stopping condition is not met (see for example, changes to the amplifier settings, settings of: volume 16a, bass 18a, treble 20a . . . volume 16n, bass 18n, treble 20n, FIG. 2 for an example illustration).

As another example, as noted in U.S. Patent Application No. 63/148,692, having the title "Robotic System for Controlling Audio Systems," the process can carry out training file generation of an audio system by performing autonomously and under computer control until a stopping condition is met a series of tests to generate data sets. Here the stopping criteria can include factors such as a predetermined number of captured data sets have been collected, a process determines to stop, a sufficiently dense population of captures is collected, all desired combinations have been collected other reason to stop, etc.

Moreover, the select control of the audio system can be set to the initial control value by coupling a physical robotic system to the audio system such that the robotic system is computer controlled to operate the select control of the audio system and controlling the robotic system to set the select control of the audio system to an initial setting. In some embodiments, a computer can send control commands to the robotic system, where the robotic system comprises a microcontroller and at least one electro-mechanical device that is configured to operate the select control. In certain embodiments, movement of the robotic system between successive positions approaches a uniform random distribution.

Alternatively, a user can manually adjust the control(s) in order to generate the training data sets. Here, the user can manually adjust the control(s) according to a desired preference, or the user can manually adjust the controls (e.g., in lieu of a robotic device) according to a control sequence generated by the system. The control sequence is described in greater detail in U.S. Patent Application No. 63/148,692. For instance, where a user does not have access to a robotic device, the system generates a control sequence that uses a random distribution to generate a list of settings to be collected. The user would then manually step through the settings in the control sequence to collect a set of training data. Where manual adjustment is implemented, the system can generate a reduced number of settings as a trade off of convenience for accuracy.

Regardless, as noted above, a select control of the audio system is set to an initial control value selected within a control space. By way of example, with regard to FIG. 2, the select control is a control on the reference audio system, e.g., a potentiometer, a switch, an encoder, a rotary switch, a liner/slide potentiometer, etc. For the case of a potentiometer of the audio system, the initial control value is an initial setting, and the control space represents the range of settings of the potentiometer. Likewise, where the select control is a switch of the audio system, the initial control value is an initial switch setting, and the control space represents the range of settings of the switch. In an example embodiment, changing the control value of the audio system to a new value if the stopping condition is not met comprises changing at least one setting of the audio system, unless a determination is made that enough training files have been collected.

In some embodiments, the stored captures/recording/training files are passed to an artificial neural network to build a model/emulation that accounts for the changes to the control(s). That is, the process comprises generating a emulation of the audio system from the artificial neural network that has learned the behavior of the audio system, including the behavior of the control, the emulation including a virtualization of the control such that user adjustment of the virtualization of the control in the emulation reflects corresponding behavior of the audio system when the emulation is utilized to generate audio.

Moreover, the emulation system 110 can receive a responsive capture from a remote source, e.g., via a network connection, via loading using a universal serial bus USB connection, etc. For instance, a robotic system such as that described in U.S. Patent Application No. 63/148,692 (already incorporated by reference) can capture a number of settings of a reference audio system, and a responsive capture can be created by training a neural network, e.g., using the techniques set out in U.S. patent application Ser. No. 16/738,512 (also already incorporated by reference), as modified by the disclosure herein.

Regardless of whether created external or internal to the emulation system 100, the result is a one-to-many capture where a single "capture" now represents a "device-level" or "system-level" capture and not just a "device at one setting" capture.

Although specific configurations are described herein for sake of illustration, and not by way of limitation, it should be understood that any combination of features described herein and/or incorporated by reference herein and/or appended herein, can be combined in any order. For instance, any features, alone or in combination, described in herein, including any combination of features in the documents incorporated by reference can form the basis of a claim or claims.

Any process descriptions or blocks in flow charts should be understood as being executable out of order from that shown or discussed, including substantially concurrently or in reverse order, depending on the functionality involved, as would be understood by those reasonably skilled in the art of the present disclosure.

The iterative process, training of a neural network, including the use of a perceptual loss function, can be applied through a computer program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted, or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system comprising:
a chassis, the chassis supporting:
an instrument port that is electronically couplable to a musical instrument;
an output port that is electronically couplable to an input of a physical audio system to be modeled, the physical audio system comprising a physical audio control;
an input port that is configured to receive an electrical audio signal from the physical audio system;
a user interface having a user-adjustable control;
electronic circuitry comprising:
a test audio signal generator operable to generate a test audio signal; and
a processor coupled to memory, the processor operable to communicate with the instrument port, the output port, the input port, and the user interface;
wherein the processor, responsive to a first mode control, the first mode control designating a model building mode, controls the electronic circuitry to train a digital model of the physical audio system at multiple different settings of the physical audio control by repeatedly performing a training process until a stop condition is satisfied, each repeated performing through the training process being carried out at a new one of the multiple different settings of the physical audio control to:
control the test audio signal generator to output the test audio signal to the output port, whereupon the test audio signal is coupled to the input of the physical audio system;
receive via the input port, a physical audio system output signal, which is generated responsive to the physical audio system processing the test audio signal; and
compute parameters of the digital model from:
the test audio signal; and
the received physical audio system output signal; and
a received identification of the new setting of the physical audio control;
wherein the processor is further programmed to build the digital model from the computed parameters and store the digital model in the memory;
wherein the processor, responsive to a second mode control, the second mode control designating a user performance mode, controls the electronic circuitry to:
receive a change to the user-adjustable control at the user interface, the user-adjustable control programmed to implement a virtual control representing the physical audio control that was changed during implementation of the model building mode;
input an electronic instrument signal received at the instrument port, to an input of the digital model; and
control an output of the digital model to emulate a corresponding output of the physical audio system at a setting of the physical audio control corresponding to a user-adjusted setting of the virtual audio control.

2. A system comprising:
a chassis, the chassis supporting:
an output port that is electronically couplable to an input of a physical audio system to be modeled, the physical audio system comprising a physical audio control;

an input port that is configured to receive an electrical audio signal from the physical audio system;
a user interface having a user-adjustable control;
electronic circuitry comprising:
a test audio signal generator operable to generate a test audio signal;
a processor coupled to memory, the processor operable to communicate with the output port, the input port, and the user interface;
wherein the processor controls the electronic circuitry to train a digital model that models the physical audio system at multiple different settings of the physical audio control by repeatedly performing a training process until a stop condition is satisfied, each repeated performing through the training process being carried out at a new one of the multiple different settings of the physical audio control to:
control the test audio signal generator to output the test audio signal to the output port, whereupon the test audio signal is coupled to the input of the physical audio system;
receive via the input port, a physical audio system output signal, which is generated responsive to the physical audio system processing the test audio signal; and
compute parameters of the digital model from:
the test audio signal;
a received identification of the new one of the multiple different settings of the physical audio control; and
the received physical audio system output signal, wherein the processor is further programmed to build the digital model from the computed parameters and store the digital model in the memory.

3. The system of claim 2, wherein the physical audio control comprises a select one of:
a physical volume control;
a physical treble control; and
a physical bass control.

4. The system of claim 2, wherein the physical audio system comprises an audio system selected from the group consisting of:
a physical audio amplifier;
a physical audio cabinet; and
a physical overdrive pedal.

5. The system of claim 2, wherein the digital model is a neural network.

6. The system of claim 5, wherein to train the model, the processor further organizes the test audio signal, the setting of the physical audio control, and the audio system signal into a data triplet.

7. The system of claim 5, wherein computing the parameters of the digital model comprises determining parameters of the neural network, wherein determining the parameters of the neural network comprises applying a perceptual loss function based upon a psychoacoustic property.

8. The system of claim 7, wherein determining the parameters of the neural network further comprises setting parameter values in response to the applied perceptual loss function.

9. The system of claim 2, wherein the physical audio system exhibits a nonlinear response.

10. The system of claim 2, wherein:
the user interface comprises a touchscreen; and
the touch screen implements the user-adjustable control as a virtual knob, where the virtual knob is programmed by the processor to represent at least one of:
a select physical control of the physical audio system; and
a combination of controls of the physical audio system.

11. A system comprising:
a chassis, the chassis supporting:
electronic circuitry comprising:
a test audio signal generator operable to generate a test audio signal; and
a processor coupled to memory;
an audio output port that is electronically couplable to an input of a physical audio system to be modeled, the physical audio system comprising physical audio controls, the physical audio controls comprising physical audio control settings, the physical audio system for generating an audio system signal in response to the test audio signal, the audio system signal being a function of the test audio signal and the physical audio control settings;
a user interface communicably coupled to the processor, the user interface comprising virtual audio controls, each virtual audio control having virtual audio control settings;
a return port for capturing the audio system signal; and
a switch operatively controlled by the processor, the switch comprising a capture input setting to select the test audio signal and couple the test audio signal to the audio output port;
wherein the processor implements a capture mode responsive to the capture input setting, the capture mode for executing an iterative process until a threshold condition is met, each iteration through the iterative process being carried out at a new one of the physical audio control settings to:
receive the test audio signal; and
determine parameters of a digital model from:
the test audio signal;
the new one of the physical audio control settings; and
the audio system signal at the new one of the physical audio control settings; and
associate new virtual audio control settings to the new physical audio control settings;
wherein the processor builds or modifies a digital model from the determined parameters that are stored in the memory, the digital model modeling the physical audio system at multiple different physical audio control settings; and
wherein, the processor controls an output of the digital model to emulate a corresponding output of the physical audio system at physical audio control settings corresponding to user-adjusted virtual audio control settings.

12. The system of claim 11, further comprising an instrument input port for electronically coupling to a musical instrument, the instrument input port further for receiving instrument signals generated from the musical instrument; and
wherein:
the switch further comprises a user input setting to select the instrument signals; and
the digital model further comprises a user mode responsive to the user input setting, the user mode for:
receiving a change in a virtual control setting at the user interface; and altering an output of the digital model in response to receiving the change.

13. The system of claim 11, wherein the physical audio control settings comprise:
- a physical volume control setting;
- a physical treble control setting; and
- a physical bass control setting; and wherein the virtual audio control settings comprise:
- a virtual volume control setting corresponding to the physical volume control setting;
- a virtual treble control setting corresponding to the physical treble control setting; and
- a virtual bass control setting corresponding to the physical bass control setting.

14. The system of claim 11, wherein the physical audio system comprises an audio system selected from the group consisting of:
- a physical audio amplifier;
- a physical audio cabinet; and
- a physical overdrive pedal.

15. The system of claim 11, wherein the digital model is a neural network.

16. The system of claim 15, wherein the threshold condition is a predefined error.

17. The system of claim 15, wherein computing the parameters of the digital model comprises determining the parameters of the neural network, wherein the determining the parameters of the neural network comprises applying a perceptual loss function based upon a psychoacoustic property.

18. The system of claim 17, wherein determining the parameters of the neural network further comprises setting parameter values in response to the applied perceptual loss function.

19. The system of claim 11, wherein the physical audio system exhibits a nonlinear response.

* * * * *